(12) United States Patent
Nichols et al.

(10) Patent No.: US 12,437,173 B2
(45) Date of Patent: Oct. 7, 2025

(54) COLOR MAP WRAPPERS AND PACKETS (71) Applicant: Hewlett-Packard Development Company, L.P., Spring, TX (US)

(72) Inventors: Stephen J. Nichols, Vancouver, WA (US); George Henry Kerby, Boise, ID (US)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 328 days.

(21) Appl. No.: 18/032,798

(22) PCT Filed: Oct. 29, 2020

(86) PCT No.: PCT/US2020/057917
§ 371 (c)(1),
(2) Date: Apr. 19, 2023

(87) PCT Pub. No.: WO2022/093228
PCT Pub. Date: May 5, 2022

(65) Prior Publication Data
US 2023/0394265 A1 Dec. 7, 2023

(51) Int. Cl.
G06K 15/00 (2006.01)
G06K 15/02 (2006.01)

(52) U.S. Cl.
CPC ....... G06K 15/407 (2013.01); G06K 15/1878 (2013.01)

(58) Field of Classification Search
None
See application file for complete search history.

(56) References Cited

U.S. PATENT DOCUMENTS

| | | | |
|---|---|---|---|
| 6,055,543 A * | 4/2000 | Christensen | G06F 16/10 |
| 6,097,838 A | 8/2000 | Klassen et al. | |
| 7,333,239 B2 | 2/2008 | Oshikawa et al. | |
| 8,363,292 B2 | 1/2013 | Sugiura et al. | |
| 9,025,208 B2 | 5/2015 | Kisilev et al. | |
| 9,111,204 B2 | 8/2015 | Fujita et al. | |
| 9,992,382 B2 * | 6/2018 | Hu | H04N 1/6008 |
| 10,674,043 B2 * | 6/2020 | Tang | H04N 1/6008 |
| 2002/0101444 A1 | 8/2002 | Novak et al. | |
| 2015/0358646 A1 | 12/2015 | Mertens | |
| 2017/0280025 A1 | 9/2017 | Nichols et al. | |
| 2018/0295257 A1 | 10/2018 | Gondek et al. | |

(Continued)

FOREIGN PATENT DOCUMENTS

| | | |
|---|---|---|
| CN | 101329682 A | 12/2008 |
| CN | 104995903 A | 10/2015 |

(Continued)

Primary Examiner — Thomas D Lee
(74) Attorney, Agent, or Firm — Foley & Lardner LLP (57) ABSTRACT A memory structure stores a plurality of color maps, the entity, when decompressed by a printer controller, comprising a plurality of first level wrappers, each first level wrapper including at least one characteristic to identify a corresponding color map, and a recipe to define and locate packets for constructing the color map, the recipe having at least one locator for each second level wrapper; and a plurality of second level wrappers of different types, each second level wrapper wrapping a corresponding packet.

25 Claims, 5 Drawing Sheets (56) References Cited

U.S. PATENT DOCUMENTS

2019/0134991 A1   5/2019  Shaw et al.
2020/0361214 A1   11/2020 Nichols et al.

FOREIGN PATENT DOCUMENTS

| CN | 106573472 A | 4/2017 |
| CN | 109155812 A | 1/2019 |
| EP | 3267672 A1 | 1/2018 |
| EP | 3267673 A1 | 1/2018 |
| KR | 10-2017-0028989 A | 3/2017 |
| KR | 10-2019-0006076 A | 1/2019 |
| RU | 2659878 C1 | 7/2018 |
| RU | 2696606 C1 | 8/2019 |
| WO | 2016/028272 A1 | 2/2016 |
| WO | 2016/028282 A1 | 2/2016 |

* cited by examiner

COLOR MAP WRAPPERS AND PACKETS

CROSS-REFERENCE TO RELATED APPLICATIONS

This application is a U.S. National Stage Patent Application under 35 U.S.C. 371 of PCT/US2020/057917, filed Oct. 29, 2020, which is hereby incorporated by reference in its entirety.

BACKGROUND 2D and 3D print systems include one or more replaceable print apparatus components, or cartridges, such as inkjet cartridges, toner cartridges, organic photoconductor (OPC) drums, (2D or 3D) ink supplies, 3D print agent supplies, build material supplies etc. Some of these components may be commonly referred to as cartridge. Cartridges may contain print material. The print material is of a certain color such as cyan, magenta, yellow, black, white, etc. Different print systems may be designed to operate with different print material types having different colorant characteristics in addition to the color, such as chemical composition, particle/pigment weight, etc. Examples of components without print material are fuser units.

Print systems convert from one color space to another color space, such as from a screen color space to a printer color space. Examples of color conversion between color spaces are from RGB to CMYK, common in many print systems, or from RGB to monochrome. The color conversions may be executed by the printer using CLUTs (Color Look Up Tables), also referred to as color maps or color tables. Color maps may be configured depending on the print material colors, print material type, the print media type, the printer model, etc.

Since recently, in certain print platforms, color maps are stored on memories adhered to replaceable print components. When the cartridge is installed, the color map may be downloaded from the memory of the cartridge. Typically an EEPROM of limited space is used for these memories, and more space increases the cost per unit. For that reason, the color maps are compressed. Certain cartridge color maps are referred to as channel maps, because they are in fact partial color maps, or color maps of one single color channel, associated with the specific color of the print material in the replaceable component.

BRIEF DESCRIPTION OF DRAWINGS

Non-limiting examples will now be described with reference to the accompanying drawings, in which.

DETAILED DESCRIPTION

The contents of other applications and patents cited in this disclosure are incorporated by reference.

In this disclosure color maps for single color channels may also be referred to as channel maps or partial color maps. Channel maps or partial color maps can be used for single color cartridges. A printer controller can combine the channel maps on the different installed cartridges to construct a multi-dimensional color map for color conversion between color spaces. A channel map for black, or "shaper table", could form a mono-dimensional color map by itself.

In other examples, certain compressed partial color (i.e., channel) table portions, or "difference" tables, can be stored on a cartridge memory, whereby a base table or reference table may be stored on the printer-side memory, whereby the difference and reference table are to be combined to obtain the full color table. Reference is made to international patent application publications Nos. WO2018/009226A1, WO2018/009235A1, WO2018/009234A1 and WO2018/009238A1, hereby incorporated by reference. Hence, a partial color table may involve a channel map for a multi-dimensional color table, a difference table, a cartridge-side channel or color map for further combining with a printer-side base reference table, or all or any of those combined. Unless specifically defined, a color map may comprise any of these channel maps, partial color maps, or any one- or multi-dimensional color map, in either compressed or uncompressed format.

In international patent application publication No. WO2016/028272A1 examples of transform wrappers are discussed. These transform wrappers locate color maps or color map components stored a primitive data in a cartridge memory. The transform wrapper contains metadata so that a printer controller can quickly locate the channel map, at run-time, using at least one of tags, properties and conditions, when a new cartridge is installed. One embodiment of that publication refers to a compressed, full, channel map comprising a high-resolution neutral axis, seed nodes and a delta table. A further embodiment of that publication involves a recipe for the printer controller to decode such compressed color map. A similar compressed color map is discussed in more detail in US patent publication No. 9621764. For these color maps, pyramid-based compression schemes are used.

Other color maps and color conversion techniques, referred to as DCT (Discrete Cosine Transform) type color maps and color conversion, are disclosed in the above mentioned international patent application publications Nos. WO2018/009226A1, WO2018/009235A1, WO2018/009234A1 and WO2018/009238A1. In certain implementations these color maps have a reference table stored on the printer-side, whereby a difference table is stored on the cartridge side. In this disclosure, these compressed DOT-type difference color tables may be referred to as DOT color maps or DCT type color maps. The DOT color maps may comprise quantized DOT coefficients, residual nodes and a deltascalar multiplier. For monochrome print cartridges a CBAT (Coefficient Bit Assignment Table) may be included on the cartridge-side.

The present disclosure addresses alternative (transform) wrappers and packets to construct the DOT-type (Discrete Cosine Transform) color maps, or at least the difference tables. An architecture and structure was designed to readily store and locate DOT-type color maps on a cartridge memory, using a novel layered wrapper-recipe-and-packet structure, whereby the color maps can be quickly located and built at runtime by the printer controller.

Figure 1:
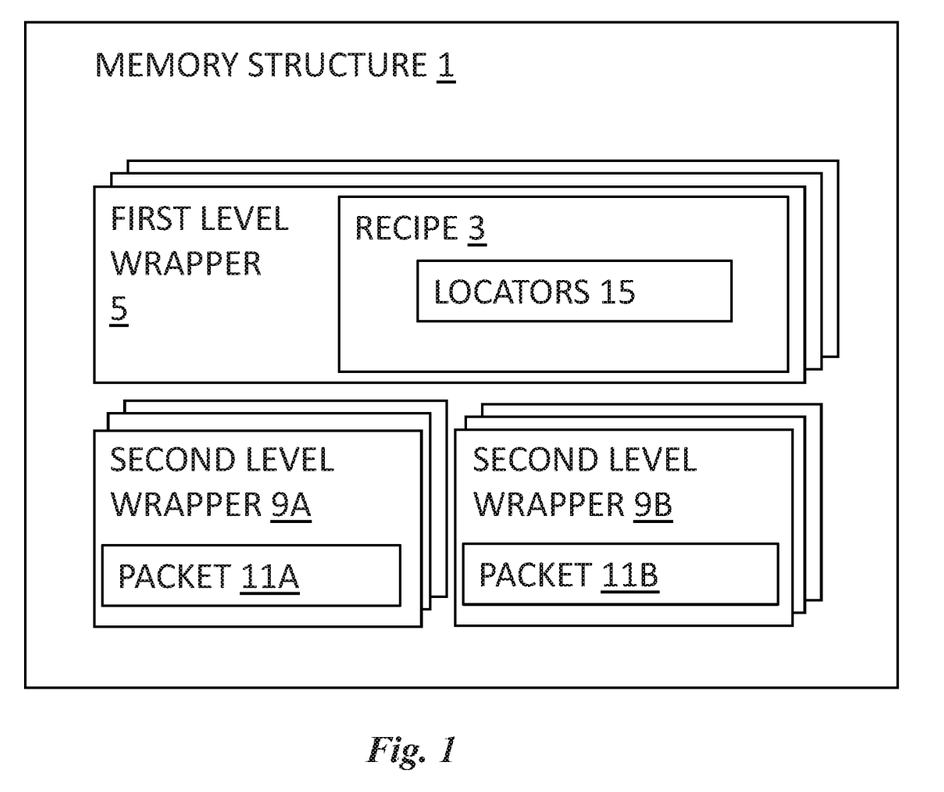
FIG. 1 is a diagram of an example of a memory structure of an integrated circuit.

FIG. 1 illustrates a memory structure 1 that can be part of an IC (Integrated Circuit) as adhered to, or otherwise integrated with, a replaceable print component. The memory structure 1 stores color map data comprising a wrappers 5, 9A, 9B and primitive data comprising packets 11A, 11B. The wrappers may be transform wrappers but can herein be referred to as simply "wrappers". The color map data may (but need not) be related to a print material contained by the print component or otherwise related to the print component and memory structure 1. For example color map packets may pertain to Cyan while the print material may be Cyan. Note that certain color map data may be stored on the memory structure 1 that relates to a different color than the color of the print material. For example color map packets pertaining to Cyan could be stored on a black cartridge memory structure.

The wrappers include higher-level components here defined as first level wrappers 5 (e.g., color map wrappers) to locate lower-level components here defined as second level wrappers 9A, 9B (e.g., DCT wrappers, residue wrappers), using locators 15 in a recipe 3. The wrappers 5, 9A, 9B and recipe 3 are to locate corresponding data packets 11A, 11B comprising components to construct the color map. The locators 15 are provided in the recipe 3. The packets 11A,11B form the primitive data, for example, encoded as DOT tables and residue tables (as illustrated) and/or compressed. Examples of the packets 11A, 11B include a DOT packet, residue packet, deltascalar packet and CBAT packet. The packets 11A, 11B can be considered as pertaining to a third, lower level.

A color map is to be constructed by the printer controller using the combination of packets 11A, 11B pertaining to a selected color map, as defined by the recipe 3. The first level wrapper 5 facilitates selecting the packets for the color map, and locating the corresponding second level wrappers 9A, 9B and packets 11A, 11B. The second level wrappers 9A, 9B wrap the corresponding color map packets 11A. 11B for decoding and combining/resolving to construct the color maps. The second level wrapper 9A, 9B may be considered metadata for the included wrapped packet 11A, 11B, to help locate the packet 11A, 11B. Since that primitive data is inserted in the second level wrapper 9A, 9B, a second level wrapper 9A, 9B is of a larger data size than a first level wrapper 5. The recipe 3 facilitates locating the second level wrappers 9A, 9B and packets 11A, 11B, based on its locators 15. The recipe 3 may have at least two functions including identifying the building blocks (i.e. packets) of the color map for constructing the color map, and locating these building blocks. In some examples a second level wrapper 9A or 9B and packet 11A or 11B may be shared by multiple first level wrappers 5. In this example, the content of the wrappers 5, 9A, 9B is defined as meta data to locate the packets 11A, 11B. Non-meta data that could be contained in the wrappers 5, 9A, 9B and/or recipe 3 such as primitive data or color map build instructions.

The locators 15 are meta data. Examples of locators 15 are color channels, tags, properties, and packet types, referring to similar tags etc. in the lower wrappers 9A, 9B. Tags may identify a media, axis, theme, print mode, quality, table type, a supply family ID and/or print platform ID for a corresponding color map. The metadata in the wrappers facilitates resolving the color map components at a printer's runtime. In some examples the wrappers consist of meta data only. The packets 11A, 11B are stored in the primitive data.

The packets 11A. 11B may be considered primitive data 13 because they form the basic building blocks for constructing the color maps, as opposed to metadata, used to describe other data components, such as the primitive data. In this disclosure metadata may be used to locate primitive data such as the packets. Higher level meta data such as the first level wrappers 5 may be used to locate lower level meta data such as the second level wrappers 9A, 9B.

The packets 11A, 11B are of different types, such as a DOT packet and a residue packet. A plurality of color maps (and color map wrappers 5) may be associated with an equal plurality of packets of each type 11A and 11B. Hence, subsets of packets, of a first type 11A and a different second type 11B, are to be combined to obtain a single selected color map based on the recipe 3. In other examples there are three or four different type packets 11A, 11B.

The layered wrapper-and-packet structure may facilitate ready downloading followed by local storage, for example on flash memory, of the color map data on a printer by its printer controller, and consequently, readily resolving the color map components by the printer controller at runtime, with relatively little added latency to the print job or print system (if any), for example when powering up a printer or installing a new print cartridge. After installation of the new cartridge, printing may be continued with updated color maps for newly installed cartridges, obtaining potentially better or at least updated color control. The disclosed wrapper structure provides for layers of flexibility and control by wrapping the color table components (e.g., PFD records) in "packet" objects, describing the packets with metadata (such as tags and properties), and referencing the packets in multi-level components (wrappers) using recipes that are resolved at runtime. Because of the novel structure, the color map data, including the wrappers and primitive data may be compressed as a single blob of data, which in turn may allow for greater data space saving as compared to compressing individual packets.

As will be further discussed below, the DOT type color map packets may be used to facilitate conversion between different dimensionalities and characteristics of color spaces, such as from 1D to 1D for monochrome or grayscale color conversion, examples of which may be referred to as "shaper tables"; from 3D to 1D for channel maps, such as from RGB to K, RGB to C, RGB to M, RGB to Y, RGB to R, RGB to G or RGB to B; from 3D to 3D for color maps such as from RGB to RGB; and, from 3D to 4D for color maps such as from RGB to CMYK. The conversions between the different dimensionalities (1 D, 3D, 4D) as well as color spaces (RGB, CMYK) and channels (R, G, B, C, M, Y, K) may, in this disclosure, be referred to as "dimensionalities". Examples of the layered DOT color map wrapper approach in this disclosure may increase efficiency, accuracy, flexibility and/or modularity of the color conversion system.

Figure 2:
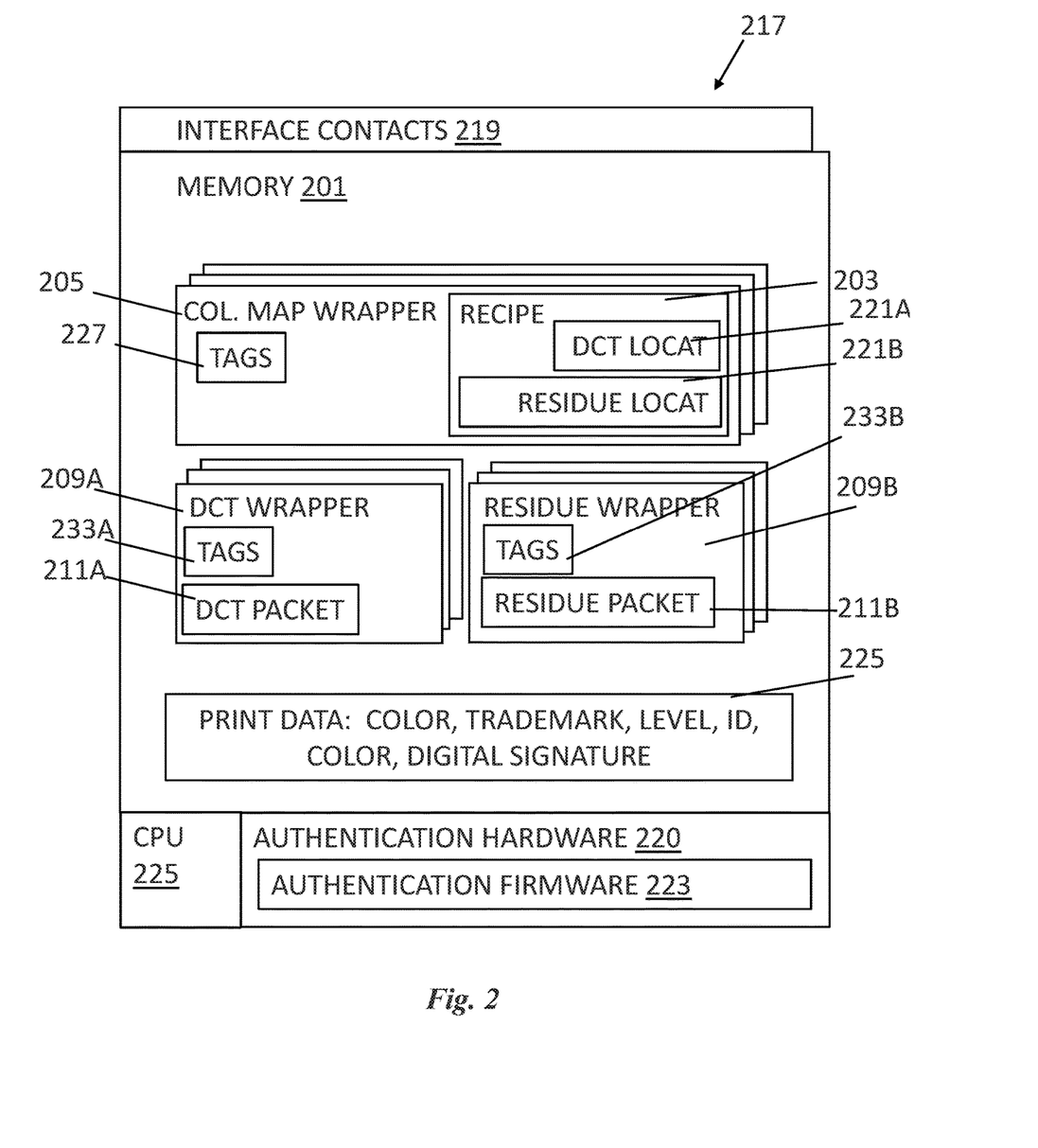
FIG. 2 is a diagram of an example of an integrated circuit.

FIG. 2 illustrates an example of an integrated circuit 217 for a replaceable print component. The replaceable print component may include a reservoir containing print material of a predetermined color, such as C, Y, M or K. Print material may include toner, ink and/or any 2D or 3D print agents. The integrated circuit 217 includes a memory 201 to store data including color map data, which color map data includes first and second level wrappers 205, 209A, 209B that comprise meta data, and different corresponding packets 211A, 211B in primitive data 213. The wrappers 205, 209A, 209B and packets 211A, 211B may be compressed together. Each packet 211A, 211B may have been separately encoded or compressed by breaking the difference table down into quantized DOT coefficient table (DOT Packet), residue nodes to add to selective nodes of the DOT table outside of an error threshold (Residue packet 211B), and in certain examples a delta scalar multiplier (deltascalar packet, see FIG. 3). For printing, each packet 211A, 211B is to be decoded separately before constructing the color map.

The integrated circuit 217 may include interface contacts 219 to, when installed, in response to a request from a printer controller, communicate data related to the component such as the color map data to the printer controller. The contacts

219 may be provided external to the integrated circuit 217 and/or print component for contacting an interface bus of the printer controller, for example an I2C serial interface bus.

The integrated circuit memory 201 may store print data 225 other than color map data such as print component characteristics including a color of the print material, and/or a product ID and/or serial number of the replaceable component. The print data 225 may include a level of print material in the component, which may be updated by the printer controller based on drop count, page count, sensor information, and/or other (e.g., cyclical) information such as cycles of a roller of a toner transfer component. The print data may comprise wear information. The print data may comprise service information such as ink prime event frequency or history, or historical use information. The print data may comprise a date of manufacturing, a date of first install, etc. The print data may comprise printer information about the printer, printer fleet or printer platform, or a number of different printers, in which the cartridge is installed and/or has been previously installed. The print data may comprise a product and/or cartridge ID, OEM trademark information, digital signatures, etc. In one example at least a part of the print data may be digitally signed. The integrated circuit 217 may be a microcontroller such as a secure microcontroller, comprising a CPU 225, authentication hardware 220 and firmware 223 for cryptographic authentication of communications between the printer controller and the integrated circuit 217, and/or other secure authentication features. When the replaceable print component is installed in the printer, an authentication session may be initiated. After positive authentication, the printer controller 1 may authorize the printer to print. After the authentication, the integrated circuit 217 may transmit its data including the color map data to an internal memory of the printer in response to an authenticated request.

Different color maps have been designed for different media, qualities, print modes, dimensionalities, etc. From a plurality of different color map wrappers 205 a corresponding plurality of color maps can be constructed, by combining decoded packets 211A, 211B wrapped in the second level wrappers 209A, 209B. The color map wrapper 205 includes tags 227 representing one or more of the characteristics of the desired color map. An example of a tag 227 or characteristic is media (e.g., glossy or plain), because different color maps may be used for different media types. Print quality, axis, table type, print mode and theme are other example tags 227. A printer controller may select a color map based on one or more tags 227 and/or other characteristics. The color map wrapper is a first level wrapper and its tags 227 can be referred to as first level tags 227. The second level wrappers 209A and 209B may be provided with their own second level tags 233A, 233B. In the illustrated example the second level wrappers include DCT wrappers 209A and residue wrappers 209B that each wrap around a corresponding DCT packet 211A and residue packet 211B.

Each color map wrapper 205 may include a color map recipe 203 to indicate the components with which to construct the color map. In this example, the recipe 203 identifies the second level wrappers 209A, 209B by locators 221A, 221B. The locators 221A, 221B may identify the second level tags 233A of the second level wrappers 209A, 209B. The locators 221A, 221B may identify the first level tags 227 and/or the second level tags 233A, 233B, for example by referring to the first or second level tags or by including them. For example, the recipe 203 may identify at least one second level wrapper 209A or 209B by reciting the first level tags 227 or by providing a reference to its first level tags 227, so that the printer controller may identify the second level wrapper 209A, 209B having second level tags 233A, 233B that are the same as the first level tags 227. An example of a locator 221A, 221B including a reference to the first level tag 227 can be encoded as "parent_tag". This facilitates that a printer controller reading the locators 221A, 221B, that refer to the first level tags 227, and then locates second level tags 233A, 233B that are the same as the first level tags 227 to find the corresponding packets 211A, 211B. For example, the color map wrapper 205 pertains to "glossy" media and the second level wrappers 209A, 209B, as linked by the recipe 203, also pertain to glossy media. Then the first and second level wrappers 205, 209A, 209B may have the same first and second level tags 227, 233A, 233B, respectively. It is mentioned that for the meta data to function properly the wrappers 205, 209A, 209B may have overlapping tags, properties and other characteristics. This aspect of certain examples of the wrapper structure may facilitate that the compression of the wrappers and packets as a single compressed data container can be extra efficient: "redundant" data may lead to higher compression ratios.

In another example, the locators 221A, 221B (or just one locator 221) may include second level tags 233A, 233B different than the first level tags 237A, 237B of the same color map wrapper 205, for example where the located wrappers 209A, 209B/packets 211A, 211B are shared with another color map wrapper and color map. For example, a color map may be for glossy media, whereby the characteristics of the color map wrapper 205 also pertain to glossy media. The recipe 203 may choose to locate second level wrappers 209A, 209B pertaining to another color map for another media (e.g., plain) by including, for example partially or completely copying, the second level tags 233A, 233B of the other color map for the other media as locators 221A, 221B in its recipe 203. In such example, the first level tags may pertain to glossy while the second level tags pertain to plain media. In this way, an individual second level wrapper 209A or 209B and packet 211A, 211B, or combinations of second level wrappers 209A and 209B and packets 211A, 211B, can be shared by a plurality of recipes 203 and color map wrappers 205. This may also facilitate that less packets need to be stored on the memory 201.

The second level wrappers 209A, 209B include a plurality of DOT wrappers 209A, each DOT wrapper 209A comprising second level tags 233A, representing characteristics of an associated DCT packet 211A. The associated DCT data packet 211A may be wrapped by the DOT wrapper 209A. The DOT wrapper 209A and associated packet 211A may be configured to construct the color map that corresponds to the color map wrapper 205 that identifies the DOT wrapper 209A in its recipe 203. The second level tags 233A can be identified by the locators 221A of the first level recipe 203. The DOT wrappers 211A wrap the data packet 211A for the printer controller to be able to directly fetch the packet 211A through following the wrappers. Similarly, the second level wrappers include a plurality of residue wrappers 209B, each residue wrapper 209B comprising second level tags 233B, and wrapping the associated residue packet 211B. The primitive data stores a plurality of encoded DOT packets 211A and residue packets 211B as locatable by the DOT wrappers 209A and residue wrappers 209B. The higher level recipe 203 links the DOT packet 211A to its associated residue packet 211B, via the corresponding second level wrappers 209A, 209B.

To generate a color map that is selected by a printer controller, for example based on a selected media or other selected characteristic, the printer controller, after downloading and decompressing the data from the memory 201, locates the corresponding color map wrapper 205 based on the tags 227 and/or other characteristics. The associated DCT packet 211A and residue packet 211B are then located through the wrapper structure, and each packet 211A, 211B is decoded. The nodes of the decoded residue packet are added to selective nodes of the decoded DOT packet, and the hence constructed table is to be added to nodes of a reference table stored on the host printer, whereby the color map is obtained. The disclosed wrapper structure provides for fast location during runtime and resolving of the color table components by the printer controller, while facilitating adaptions and combinations on individual packets level. The disclosed wrapper structure facilitates a usage for a broad and relatively widely variety of color table dimensions and print materials. The disclosed wrapper structure also facilitates ready adaptations for adding continuously updated color maps to print components, for example in response to print material changes, printer platform hardware changes, customer requests, software changes, upgrades, etc. Color map upgrades may involve adding new media types, new color conversion dimensionalities or color spaces, new print material compositions or colors, novel printheads, novel toner transfer components, novel replaceable print components, etc. The presently disclosed examples may facilitate readily updating the color maps, even where the SKU (Stock Keeping Unit) of the printer or replaceable component remains the same. The color map packets and transform wrappers of this disclosure facilitate using the same DOT compression, packet structures, and printer firmware across a relatively wide range of different printer and printer supply platforms, like for both toner and ink based print platforms, which may be unprecedented in the print industry.

In certain instances, the DCT type color maps and novel "packet" scheme facilitate more flexibility than other compression types such as the previously mentioned color maps using the pyramid-based compression scheme (having neutral axis, seed nodes and delta tables), in terms of loss, precision and flexibility. For example, the DOT-based compression can be made relatively precise, with low loss or no loss of color precision during conversion if desired, having acceptable data sizes. Also, the DOT color maps may be of smaller data size than the other color map type, which is convenient for the relatively small flash or EEPROM-type memories of the microcontrollers used to store them. A reason for the smaller size may be because a reference table is stored on the printer-side and the cartridge only stores the difference table to be combined with that reference table.

The wrapper structure of the different examples of this disclosure facilitates that all the components can be compressed together, including separately encoded packets, because the wrappers allow for the components to be located after decompression. Compressing all the packets together may provide for a higher compression rate than separate compressions (e.g., of color map components without transform wrappers) because redundancies between packets can be compressed more efficiently. Inherent redundancies across different wrappers (tags, properties or other characteristics) may provide that the wrappers do not add much to the data size of the single compressed container. Furthermore, a single (e.g., zlib) compression dictionary can be created for the entire pack of the wrappers and packets, as opposed to dictionaries for each compressed record. In turn, the reduced data size may result in at least one of: storing more color maps, using cheaper memory structures, and/or more space available for other data features. The reduced data size may also give more flexibility regarding what IC or memory storage hardware to use for the cartridge, such as of different suppliers or OEMs (Original Equipment Manufacturers).

Figure 3:
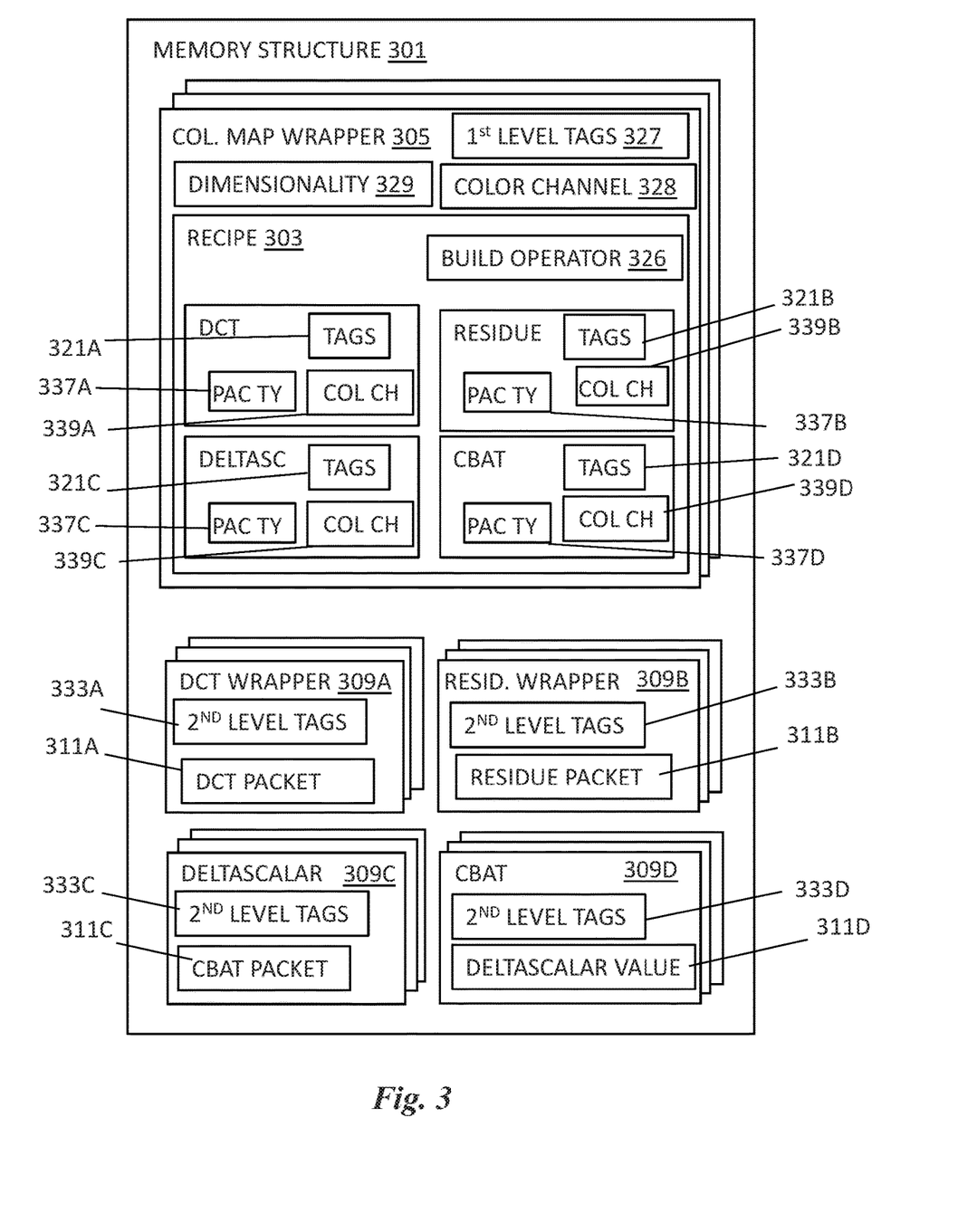
FIG. 3 is a diagram of an example of a memory structure.

FIG. 3 illustrates another example of a memory structure 301 for storing print data including color map data. The memory structure comprises first and second level wrappers 305, 309A-D, the first level wrapper 305 including a recipe 303 to identify the second level packet wrappers 309A-D that contain the packets 311A-D for constructing the color map. The wrappers are comprised of metadata to facilitate fast location of the desired packets 311A-D, each locatable by the corresponding second level wrapper 309A-D. The combination wrappers 205, 309A-D and packets 311A-D may be stored as one compressed file, to be decompressed together using a single decompression dictionary.

The first level color map wrapper 305 may comprise properties and/or first level tags 327. The properties may be specific to a type of color map. For example, the properties identify at least one of a dimensionality 329 and color channel 328 of the respective color map. The dimensionality 329 may refer to the input and output color space dimensionalities for conversion, examples of which are given above. Again, an example of a dimensionality 329 is a color map that converts from 3D to 1D, for example from RGB to C, Y, M or K. Another example of a dimensionality 329 is from 1D to 1D, for example for monochrome printing using black (K) print material. A color map pertaining to the single color print material may be a channel map for further combination with the channel maps of the other three print materials to build a full multi-color map for conversion to the CYMK output color space, hence the dimensionality of 3D to 1D. The color channel 328 property may specify the color pertaining to the respective color map, such as C, Y, M or K.

The first and/or second level tags 327, 333A, 333B may be defined by certain characteristics of the respective color map or packet 311A-D that they help locate and resolve the color map components. Examples of first and/or second level tags 327, 333A-D are: print media, theme, axis, print system platform, print component (e.g., cartridge or supply) family, table type, media type and print quality. Examples of print media are glossy, plain, matte and coated (e.g., paper). Examples of print qualities are best, normal and draft. Examples of axes are process neutral and black neutral, which refer to the color separations for the neutral axis in a color space. Process neutral may mean the neutral colors are comprised of CMYK. Black neutral may mean that the neutral colors only use the K colorant. The table type may refer to a class of color maps, such as a "media map" class (e.g., a back-end map), a "gamut map" class (e.g., for front-end maps) or a fuser data table (or "fuser blob") for color maps on memories of replaceable electrophotographic fuser units. For example, a theme tag may be used for color maps customized to specific themes such as "RGB office" or "RGB vivid" or "RGB adobe", etc. The theme tag can be used in combination with a gamut map table type.

The recipe 303 identifies the different second level wrappers 309A-D to locate the packets 311A-D to construct the color map. The recipe 303 comprises locators that include tag locators 321A-D, or simply tags. The tag locators 321A-D include, or refer to, first level tags 327A-D, or include second level tags 333A-D, to locate the second level wrappers based on their second level tags 333A-D, as explained previously. The recipe 303 further identifies each second level wrapper 309A-D by packet type 337A-D and/or a color channel 339A-D. The color channel 339A-D in the recipe 303 may refer to the properties of the second level wrappers 309A-D. The color channel 339A-D of the recipe 303 may, but need not, correspond to the color channel property 328 of the color map wrapper 305, depending on the to-be-located packet. The color channel 339A-D of the recipe 303 may refer to the color channel property of the respective packet 311A-D and the corresponding color map. The second level wrappers 309A-D are provided with properties (not illustrated), which properties may include a color channel (which may again be used to locate the second level wrapper using the color channel 339A-D in the recipe 303). These properties may be included in the second level wrappers alongside the second level tags 331A-D and the packets 311A-D.

The illustrated example wrapper structure includes four packet types 337A-D, namely DOT packet 311A, the residue packet 313B, the deltascalar packet 311C and the CBAT packet 311D, which are correspondingly identified and located by the packet type 337A-D in the recipe 303. A wrapper structure for a monochrome color channel (e.g., black print color) may contain all four wrapper and packet types 337A-D. Other color map data for other dimensionalities or color channels may have three wrapper- and packet types 337A to 337D, whereby the CBAT wrapper 309D and packet 311B may be stored on a host printer instead of the replaceable component memory structure 301.

The second level wrappers 309A-D of the different types may include said second level tags 333A-D. The second level wrappers 309A-D may wrap around the associated packets 311A-D.

The second level wrappers include at least one deltascalar wrapper 309C, wrapping around a packet 311C of a deltascalar multiplier. A deltascalar multiplier, which can be simply referred to as deltascalar, is a value used to alter the range of the decoded/decompressed DOT data. The Deltascalar may de facto comprise a compression ratio to alter the quantization step size and resulting compression error, that results from a DOT computation. The selection of the deltascalar multiplier impacts the compression of the individual color map and components. The deltascalar multiplier is used to put the unpacked (i.e., decoded) DOT values back into the proper range so that an inverse DOT operation can be performed to create the difference table, and subsequently, the color table. For example, the deltascalar includes or is a step size referred to in earlier international patent application publications Nos. WO2018/009226A1, WO2018/009235A1, WO2018/009234A1 and WO2018/009238A1. The deltascalar multiplier is to be used by the print controller to modify the decoded DOT and/or residue packet to which it is linked by the associated recipe.

Each deltascalar wrapper 309C is identified by the recipe 303, for example through the respective tag locators 321C and deltascalar packet type 337D, and/or properties. The or each deltascalar wrapper 309C comprises second level tags 327C and deltascalar packet 311C. The deltascalar wrapper 309C may comprise properties. In one example, one deltascalar wrapper 309C and/or deltascalar packet 311C is shared by different color map wrappers 305. For example, these different color map wrappers 305 may have different properties but the same deltascalar locators 321C in the recipe 303. For example the same deltascalar may be used to build different color maps having different characteristics.

In another example, the print material of a component to which the memory structure is, or is to be, attached is black and/or suitable for monochrome printing. The second level wrappers 309A-D may include a plurality of CBAT wrappers 309D. Again, each CBAT wrapper is identified by the associated recipe 303, for example through tag locators 321D and the CBAT type 337D, and/or properties. Each CBAT wrapper 309D may comprise second level tags 333D, and wrap around a corresponding CBAT packet 311D. The primitive data includes a plurality of CBAT packets 311D associated with the plurality of deltascalar wrappers 309D. The content of each CBAT packet 311D may be configured to be decoded by a printer controller, to read/decode/parse/resolve the DOT packet 311A linked to the CBAT packet 311D by the associated recipe 303.

The packets 311A-D as stored in the memory structure 301 are to be located, decoded and combined by a printer controller, for reconstruction of the color map by the printer controller. The instructions that cause the printer controller to construct the color map, using the fetched packets 311A-D defined by the recipe 303, may be called build instructions. In one example, the building instructions are stored on the printer-side. The same build instructions may correspond to a plurality of different recipes 303, or different build instructions may be stored and used by the printer controller for reconstructing different color maps. In one example, the recipe 303 comprises a build operator 326 that refers to the building instructions that correspond to the recipe 303 and the packets 311A-D identified by the recipe 303, which build instructions are stored in a memory of the connectable host printer, and which build operator 326, when read by the printer controller, facilitates the printer controller to locate the build instructions corresponding to the recipe 303 in its printer firmware. The build operator 326 is associated with the located packets 311A-D in the recipe 303.

In a further example, also illustrated in FIG. 3, different second level wrappers pertaining to the same packet type 337C are grouped, and each group is identified by a group header. For example, when decompressed, the wrapper-structure may comprise a string of DCT wrappers 309A, a string of residue wrappers, and a string of deltascalars, each string forming a separate group of second level wrappers pertaining to a single type. Each group contains a packets 311A, B, C or D of a single type as wrapped by the second level wrappers of each group 309A, B, C or D. Cartridge memories for monochrome printing such as black print material cartridges may further comprise a string of CBAT wrappers and packets forming a separate group of second level wrappers. Each string may comprise uninterrupted continuous data. The strings or groups are configured as groups after decompression. Each group may span the plurality of color maps and a color map may be comprised of packets of the different groups (i.e. packet types). In a decompressed state, each group may be headed by a single group header, or may comprise a label, indicating the packet type to which the second level wrappers 309A-D and packets 311A-D pertain. Examples of packet types are DCT, residue, deltascalar and/or CBAT. In one example the packet type 337A-D of the recipe 303 facilitates the printer controller to locate the second level wrappers 309A-D by group because the groups may be labeled by packet type or the packet type. In some examples a group comprises only one deltascalar wrapper and/or only one CBAT wrapper.

Figure 4:
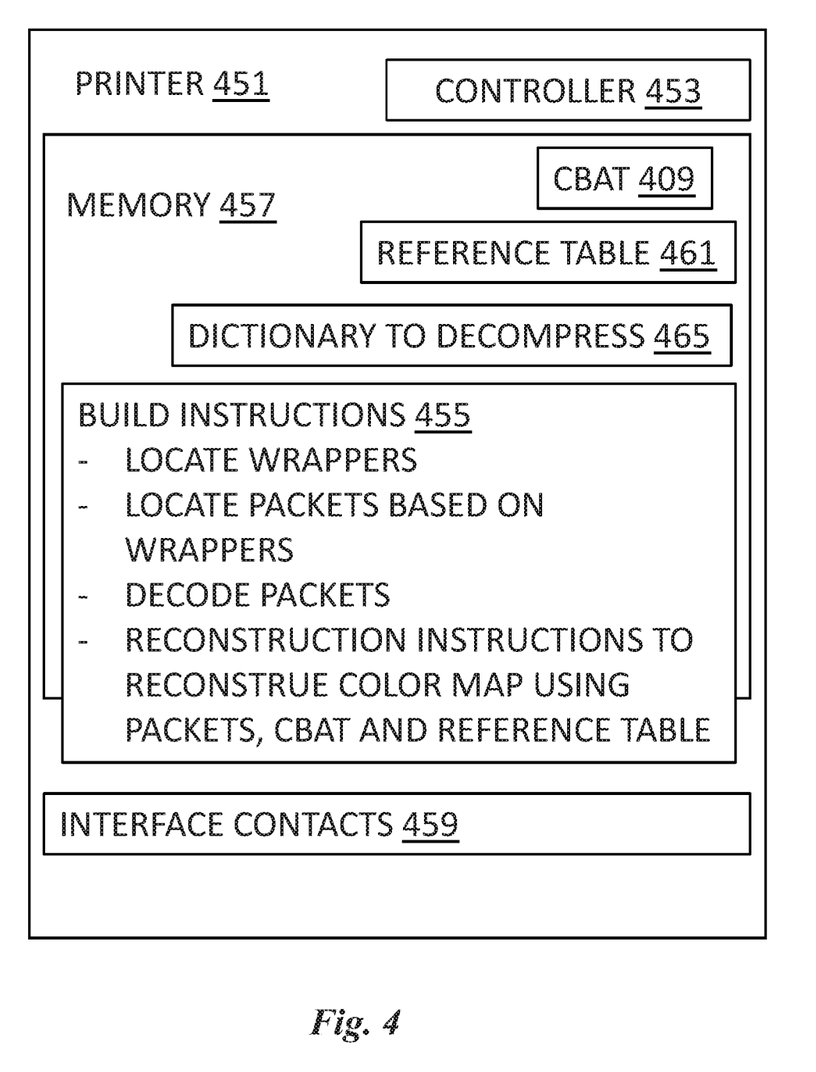
FIG. 4 is a diagram of an example of a printer.

For clarification only, FIG. 4 illustrates a printer-side interface and logic to interface with the wrapper and packet structure of this disclosure. A printer 451 may include a printer controller 453 and firmware build instructions 455 and memory 457. Printer interface contacts 459 may be provided to connect/interface with the replaceable component's integrated circuit. The memory 457 may comprise a CBAT 409 to decode the packets and a reference table 461 to be added to the difference table to reconstruct a final color table. The difference table is constructed using the earlier mentioned DCT, residue and deltascalar packets. A CBAT can be stored on the memory of the integrated circuit of the replaceable component, which CBAT initially stored on that memory can be used to reconstruct the color table. Furthermore, a dictionary 465 may be stored on the printer for the printer controller 453 to decompress the compressed data container of wrappers and packets.

The build instructions 455 for reconstructing a color map may comprise at least one of (i) instructions to locate a color map wrapper for a selected/desired color map, (ii) instructions to locate the packets based on the wrappers, (iii) instructions to decode the located packets, for example using the CBAT, and (iv) instructions to reconstruct the color map using the decoded packets, using the deltascalar and reference table.

Figure 5:
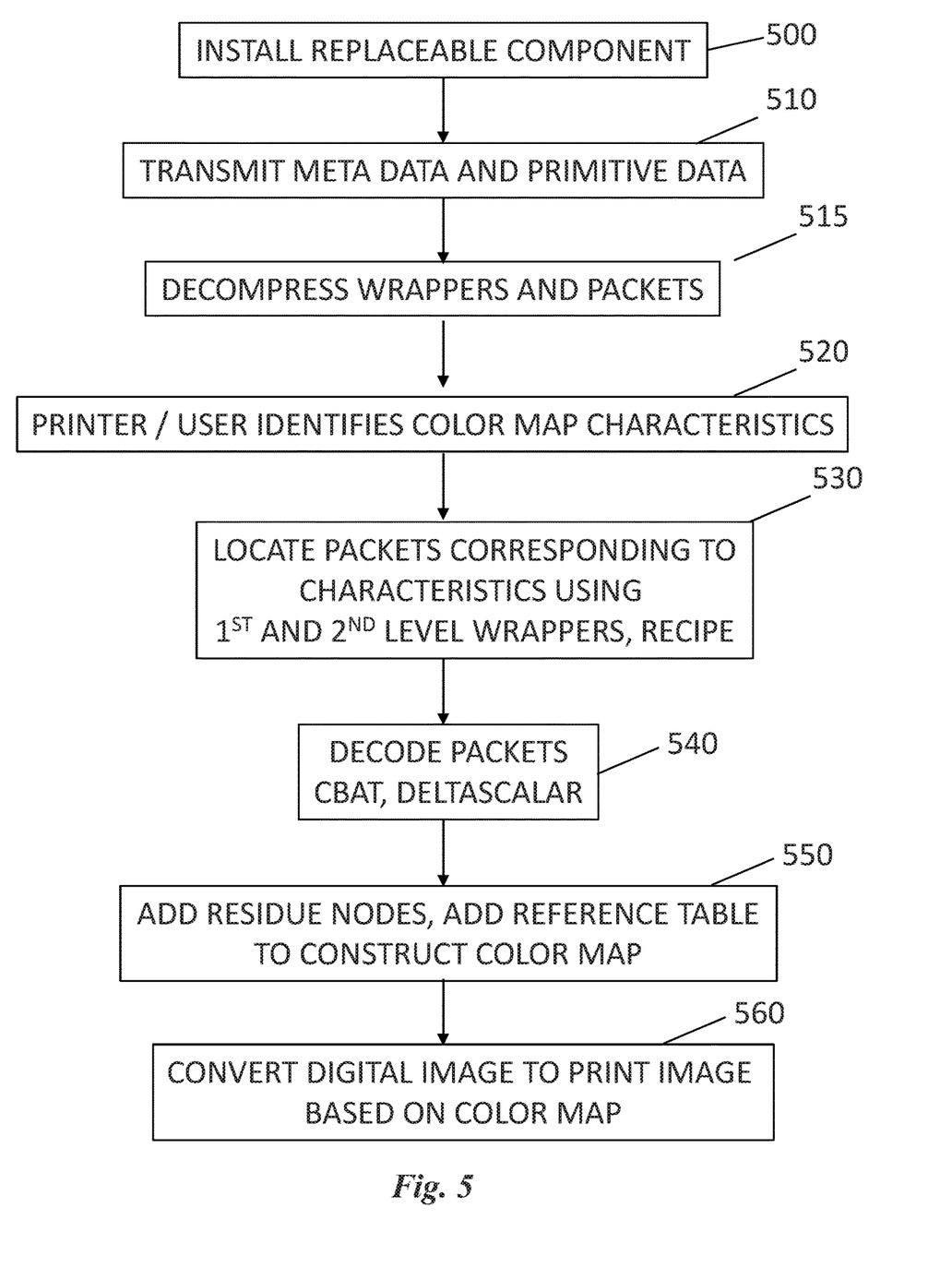
FIG. 5 is a flour chart of an example of a method of printing.

FIG. 5 illustrates a method of printing with updated color conversion in accordance with certain examples of this disclosure. At block 500 a replaceable component is installed. The replaceable component may be provided with an integrated circuit and/or memory structure of one of the examples of this disclosure. At block 510 the compressed meta data (wrappers) and primitive date are transmitted from the memory to the printer, for example based on a read request by the printer controller, in accordance with an I2C protocol. The data set may be stored in internal memory of the printer, for example in flash memory, readily accessible by the printer controller.

The entire color map data set may comprise the compressed plurality of wrappers and packets and may be decompressed by the printer controller (block 515) using a single dictionary. The wrappers and packets may be stored in decompressed format on the printer memory.

At block 520 the printer (e.g., based on a pre-selection, automatic selection, or default mode) and/or user (e.g., where manually selected) may identify print color characteristics such as print mode (e.g., grayscale vs color, draft vs best mode, etc.), color space(s), print media, theme, axis, table type, etc. These characteristics may determine which color map to select. Said characteristics may correspond to certain tags or properties of the wrappers, on the basis of which a color map can be selected and resolved. Hence, at block 530 the printer controller may locate the packets that correspond to said characteristics, without needing to browse the full data set, using the first and second level wrappers and recipe. At block 540 the located packets may be decoded using the corresponding CBAT and Deltascalar multipliers. A color map reconstruction process may be initiated. At block 550 residue nodes may be added to selective nodes of the decoded CBAT map, to create a difference table, and the difference table may be added to the reference table on the printer-side memory, to obtain the (re)constructed color map. At block 560 the print controller may convert the source digital image data to physical image color data based on the constructed color map, and instruct an image transfer component (toner transfer component, printhead, etc.) to print the image onto a media based on the physical image color data.

The disclosed primitive data may comprise pluralities of packets for constructing multiple color maps, for example more than 10 or more than 20 color maps, as corresponding to different media types, dimensionalities, etc. While the packets are each separately encoded for separate reconstruction for the different color maps, the wrappers and primitive data may be compressed as a single compressed container. For example, where different packages (DCT, residue, deltascalar) used to be compressed together as a single color map, and where these multiple individually compressed color maps were stored on the memory, with certain examples of this disclosure, the plurality of color map packets may be compressed together, whereby in decompressed format the packets are grouped by type across different color maps.

In several examples of this disclosure, an entire data set of wrappers including metadata and packets including primitive data is compressed. The compressed set therefore needs to be decompressed before the printer controller (firmware) can decode the individual components. In one example, zlib may be used for compressing the data set as a single entity. A zlib library may be stored on and used by the printer to improve the compression. In the context of this disclosure, decoding can refer to a number of actions including conversion, deserialization (where an object is created from a series of bytes), unpacking (a form of compression where, for example, two 4-bit values are stored in a single byte), or transformation (where a series of bytes are converted to another series of bytes through an algorithm or formula, such as with DOT). Decoding may also comprise the action of parsing and/or resolving. Decompression does not have to be a part of the decoding: not every component of the wrappers or packets needs to be compressed because the entire data set is already compressed, however, some decoding is implied for being able to construct the color maps. Compression and encoding of the color map data may have occurred at an initial OEM (Original Equipment Manufacturer) color map generation stage. From there, the generated, encoded and compressed color map data may be copied to different memories. It will be understood that copies of said generated, encoded and compressed color map data, copied by the same OEM or by third parties, are also to be considered generated, compressed and encoded color map data, even if the generation of that data only involved the action of copying the already generated, encoded and compressed color map data or a part thereof. The same applies to copies of copies, etc.

It is also noted that novel table types and dimensionalities are supported by the new wrapper and DCT packet structure, for example: RGB->RGB (3D->3D color maps), CMYK->CMYK (4D->4D color maps), and CMYK->C or M or Y or K (4D->1 D channel maps).

The several examples wrappers-and-packets structures of this disclosure may result in higher number of customized color maps stored on a relatively smaller data space. The wrappers-and-packet structures may add dimensionalities and functionalities previously not used, so that color conversion and color printing may be improved for these new input-output color spaces. Ultimately, the compressed example wrappers-and-packet structures may affect or improve the colors physically printed on media for a broad range of print materials and print technologies (e.g., inkjet vs laser toner), through continuously updatable color maps specific to that material or technology.

It is also noted that the color channels of the stored packets does not necessarily need to be related to the print material contained in the cartridge. For example, different color channel packets may be stored on print components that do not contain print material (e.g. fuser components), print components containing a different print material than the color channel (e.g., black print material associated with a cyan color channel packet), or the color map or packet is not customized for the specific print material because the print material is of a third party (e.g., refilled). It will be understood that the customized color map data of the wrappers-and-packets structure of this disclosure need to be created only once to thereafter be repetitively copied for the print components for which the color map data was developed or for which the color map data was not specifically developed. Both originally generated (e.g., compressed) color map data as well as copied color map data are included in the scope of this disclosure.

The invention claimed is:

1. An integrated circuit for a replaceable print component associated with a print material of a predetermined color, the integrated circuit comprising
   a memory storing print data including wrappers and packets to construct a plurality of color maps, and
   interface contacts to, when connected to a printer controller, in response to a request from the printer controller, communicate the print data to the printer controller,
   the print data including
      a plurality of color map wrappers, different color map wrappers corresponding to different color maps, each color map wrapper including
         a first level tag indicating a media for a color map, and
         a color map recipe to construct the color map, the recipe identifying second level wrappers including a DCT (discrete cosine transform) wrapper and a residue wrapper, each, by at least one locator included in the recipe;
      a plurality of DCT wrappers, each DCT wrapper comprising
         at least one second level tag corresponding to the locator, and
         wrapping around a DCT packet of the color map; and
      a plurality of residue wrappers, each residue wrapper comprising
         at least one second level tag corresponding to the locator, and
         wrapping around a residue packet of the color map; wherein
   each DCT packet is associated with a corresponding residue packet through the color map recipe.

2. The integrated circuit of claim 1 wherein to generate a selected color map, the DCT packet and associated residue packet are to be decoded, and nodes of the decoded residue packet are to be added to selective nodes of the decoded DCT packet, and the hence constructed table is to be added to nodes of a reference table stored on the host printer by the printer controller.

3. The integrated circuit of claim 1 wherein the recipe defines and locates the packets with which to construct a selected color map.

4. The integrated circuit of claim 1 wherein each locator refers to second level tags of the second level wrappers, the locator comprising
   the first level tags or a reference to the first level tags of the first level wrapper, to identify a second level wrapper having second level tags that are the same as the first level tags of the first level wrapper, or
   second level tags, whereby the located second level wrapper is shared with another color map.

5. The integrated circuit of claim 1 wherein each locator further comprises a packet type or color channel to locate a respective second level wrapper.

6. The integrated circuit of claim 1 whereby the first and second level tags specify the media or an axis of the respective color map.

7. The integrated circuit of claim 1 whereby the color map wrapper comprises properties, the properties specifying a dimensionality or color channel for the respective color map.

8. The integrated circuit of claim 1 wherein at least one second level wrapper and corresponding packet are associated with more than one color map wrapper and color map.

9. The integrated circuit of claim 1 wherein the wrappers comprise metadata so that once a new replaceable component integrated circuit is connected to the printer controller, the printer controller can locate the individual packets from the metadata, without reading through all primitive color map data, to construct the color map and print onto the media using the color map.

10. The integrated circuit of claim 1 wherein,
    the second level wrappers include at least one deltascalar wrapper, each or the deltascalar wrapper identified in the associated recipe the locator; and
    the or each deltascalar wrapper comprises at least one second level tag corresponding to the locator, and wrapping around a deltascalar packet to be used by the print controller to decode the DCT or residue packet to which it is linked by the associated recipe.

11. The integrated circuit of claim 1 wherein
    the print material is black or suitable for monochrome printing;
    the second level wrappers include a plurality of CBAT (Coefficient Bit Assignment Table) wrappers, each CBAT wrapper identified in the associated recipe by the locator;
    each CBAT wrapper comprising at least one second level tag corresponding to the locator, and wrapping around a CBAT packet configured to be decoded by the printer controller to decode the DCT packet associated with the CBAT packet by the recipe.

12. The integrated circuit of claim 1 wherein the packets are to be decoded or combined to construct the color map by the printer controller based on a set of predetermined building instructions on the printer, and
    each recipe comprises a build operator that refers to the build instructions corresponding to the recipe.

13. The integrated circuit of claim 1 wherein a plurality of different second level wrappers and associated packets, associated with different color maps but having the same packet type, is grouped into a continuous string of data, the memory structure storing different groups of different packet types.

14. The integrated circuit of claim 1 wherein p1 the packets are to be decoded separately to construct the color maps out of the combination of different packets, and
    the wrappers and packets associated with the plurality of color maps stored on the memory are compressed as a single data container, to be decompressed as a data single container.

15. The integrated circuit of claim 1 wherein the wrappers and packets are to be decompressed as a single data container using a single dictionary.

16. The integrated circuit of claim 1 wherein the first and second level tags specify a table type.

17. The integrated circuit of claim 1 wherein the second level wrappers comprise properties comprising a color channel.

18. A print material cartridge comprising the integrated circuit of claim 1 and a reservoir containing the print material associated with the color map.

19. A print cartridge memory structure storing a single compressed data container including a plurality of color maps, the data container, when decompressed by a printer controller, comprising
 a plurality of first level wrappers, each first level wrapper associated with a color map of the plurality of color maps and including
  at least one characteristic to identify a corresponding color map, and
  a recipe to define and locate packets for constructing the color map, the recipe having at least one locator for each second level wrapper that pertains to one of the packets;
 a plurality of second level wrappers of different types, each second level wrapper
  including at least one tag to facilitate being located by the locator, and
  wrapping a packet to be decoded by the printer controller; and
 a plurality of said wrapped packets of different types, wherein packets of different types are to be combined to obtain a single selected color map based on the recipe, and
 the second level wrappers comprise DCT table wrappers and residue node table wrappers and their wrapped packets comprise DCT tables and residue node tables, respectively.

20. The print cartridge memory of claim 19 wherein the at least one characteristic includes at least one of a dimensionality, color channel, media, axis type, table type, theme and print mode, each single characteristic or combination of characteristics pertains to different color table that results in a different printed output versus the same input digital image.

21. The print cartridge memory of claim 19 wherein the plurality of color maps is to be decompressed by the printer controller using a single decompression dictionary.

22. The print cartridge memory of claim 19 wherein the locator comprises at least one of a tag, packet type and color channel.

23. The print cartridge memory of claim 19 wherein the wrappers contain meta data and the packets form primitive data.

24. The print cartridge memory of claim 19 wherein the second level wrappers further comprise deltascalar wrappers or CBAT wrappers and their wrapped packets comprise deltascalars multipliers or CBATs, respectively.

25. Print cartridge to connect to a host print apparatus comprising the print cartridge memory of claim 19.

* * * * *